United States Patent
Mandich

[11] Patent Number: 5,810,053
[45] Date of Patent: Sep. 22, 1998

[54] PIPE LINER, A COILED LINER PRODUCT AND METHODS FOR FORMING, INSTALLING AND COILING THE LINER

[76] Inventor: Ivan C. Mandich, 356 Audubon St., New Orleans, La. 70118

[21] Appl. No.: 763,681

[22] Filed: Dec. 11, 1996

Related U.S. Application Data

[63] Continuation of Ser. No. 714,818, Sep. 17, 1996.

[51] Int. Cl.$^6$ ...................................................... F16L 55/16
[52] U.S. Cl. .............................. 138/98; 138/97; 264/269; 264/516; 156/287; 156/294
[58] Field of Search ........................ 138/98, 97; 264/516, 264/36, 269, 35; 156/287, 294, 187

[56] References Cited

U.S. PATENT DOCUMENTS

| | | | |
|---|---|---|---|
| 4,986,951 | 1/1991 | Ledoux et al. | 138/97 X |
| 5,034,180 | 7/1991 | Steketee, Jr. | 264/516 |
| 5,091,137 | 2/1992 | Ledoux | 138/97 X |
| 5,265,648 | 11/1993 | Lyon | 138/98 |
| 5,334,429 | 8/1994 | Imoto et al. | 138/98 X |
| 5,385,173 | 1/1995 | Gargiulo | 138/98 |
| 5,397,513 | 3/1995 | Steketee, Jr. | 138/98 X |
| 5,487,411 | 1/1996 | Goncalves | 138/98 |

*Primary Examiner*—Patrick F. Brinson
*Attorney, Agent, or Firm*—George A. Bode; Bode & Associates

[57] ABSTRACT

A thermoplastic liner is extruded in cylindrical form and deformed at a temperature below the crystallization temperature of the polyethylene material forming the liner into a generally W-shaped configuration. The liner in that configuration has three convex lobes and two concave lobes along one side of the liner with a convex portion of the liner wall along the opposite side. The cylindrical liner is initially extruded in cylindrical form and deformed by a series of axially spaced sets of rollers progressively inclined toward a vertical position wherein the final W-shaped configuration of the liner is formed. The liner has a cross-section in any direction less than one-half of the diameter of the liner when expanded into a cylindrical configuration. The deformed liner is coiled about a reel. At an installation site, the liner is pulled from the reel through the pipe and sealed at opposite ends. Steam under pressure expands the W-shaped liner to a cylindrical configuration to line the pipe.

11 Claims, 5 Drawing Sheets

PIPE LINER, A COILED LINER PRODUCT AND METHODS FOR FORMING, INSTALLING AND COILING THE LINER

This is a continuation of application Ser. No. 08/714,818, filed Sep. 17, 1996.

TECHNICAL FIELD

This invention relates to thermoplastic liners for lining cylindrical pipe lines, either initially or as a repair, for protecting the pipe lines from deterioration and particularly relates to a novel and unique pipe liner having a generally W-shaped cross-sectional configuration to facilitate insertion within a pipe line and which liner is inflatable or expandable or reformed into a cylindrical configuration to line the pipe. The invention also relates to apparatus for and methods of forming pipe line from a continuously extruded, cylindrically-shaped thermoplastic liner by deforming and bending the cylindrically-shaped extruded liner to form it into a generally W-shaped cross-sectional configuration without elongation in an axial direction thereby to maintain its wall thickness. The invention further relates to coiled pipe line of W-shaped cross-sectional configuration and methods for coiling the liner and installing the liner into an underground pipe line either as a single liner or as multiple generally concentric liners which provide higher energy absorption through changeable stresses altering tension and compression.

BACKGROUND

Currently, there are a substantial number of various apparatuses and methods for deforming cylindrical thermoplastic pipe liner into a reduced cross-section such that the liner can be inserted into and moved through a pipe to be lined and subsequently expanded into a cylindrical configuration approximating the diameter of the pipe to be lined whereby the thermoplastic material forms the interior surface of the pipe for transporting fluid or other material through the pipe. One such method for protecting the interior of pipe lines is disclosed in French Patent No. 81 07346 to Laurent. In the patent, there is disclosed a cylindrical liner formed of a thermoplastic material having historic time-memory properties, i.e., which enables in the reforming process adaptation to given shape-memory characteristics. The term "shape-memory" shall mean that the liner is reformed to fit given configurations of the internal shape, typically the cross-sectional shape, of an object, such as circular, oval, rectilinear and the like and that the thermoplastic property of "historic time memory" is the means by which this may be accomplished. That is, the liner is initially formed in a cylindrical configuration and is deformed at an appropriate temperature to reduce the cross-section of the liner, enabling introduction of the deformed liner into a pipe to be lined. The deformed liner in the pipe line is then expanded by the introduction of pressurized hot fluid, e.g., steam, and at a temperature such that the deformed liner assumes its original cylindrical shape or the shape of the host pipe. With the applied steam pressure, the liner conforms to the interior contour of the pipe. Various cross-sectional shapes of the deformed liner are disclosed in the Laurent patent, namely, "U," "H," "V," and star-shaped configurations.

Liners having generally U-shaped cross-sectional configurations, as disclosed in this French patent, have been successfully used commercially by the assignee of the present application (also the assignee of the Laurent patent) and various innovations have been made by assignee with respect to the application of U-shaped pipe liners of the French patent in a commercial sense, for example, see U.S. Pat. Nos. 3,863,365; 4,985,196; 4,986,951; 4,998,871; 5,091,137 and 5,112,211. The focus of those U.S. patents, as well as that of the Laurent patent, has been on the applicability of the shape-memory characteristics of polyethylene liner material to a generally U-shaped deformed liner for subsequent reformation or expansion within a generally cylindrical pipe to provide a lined pipe.

Other types of liners are also known. For example, in British Patent Specification 1580438, as well as in PCT application PCT/AU86/00362, WO87/03840, there are disclosed liners having generally U-shaped configurations (an X-configuration being further shown in British Patent No. 1,580,438). The liners of these documents employ semi-rigid plasticized material in cylindrical form which is forcibly mechanically collapsed, i.e., folded to form one or more depressions extending longitudinally along the length of the pipe, to provide a generally U-shaped or X-shaped configuration in cross-section. The mechanically deformed liner is maintained in the reduced cross-sectional shape by strapping. Later, when the reduced cross-section liner is installed in a pipe, the strapping is released such that the deformed liner returns to its original cylindrical configuration, i.e., spring rebounds back to its original configuration, to line the interior of the cylindrical pipe.

In U.S. Pat. No. 5,034,180, there is disclosed a method for installing a liner of plastic material in a pipe. In that patent, a thin flexible tubular membrane providing a heat containment tube is inserted into an underground pipe to be repaired. The thermally deformed liner is inserted into the tube while hot and flexible. The tubular membrane is pressurized to exclude unwanted fluids from within the existing pipe. Hot steam is injected into the tube to heat the pipe for its full length externally and internally until it assumes its original circular shape, the liner thereby being expanded against the walls of the pipe with a flexible tubular membrane therebetween.

All of these known methods deform or mechanically collapse the generally cylindrical plastic liners into a reduced cross-sectional shape enabling the deformed liner for insertion into the pipe being lined. The thermoplastic liner uses the shape-memory characteristics both in manufacturing the liner, as well as later during the reformation process to reconstitute the liner to its cylindrical configuration. The mechanically deformed liners rely on a manufacturing process which introduces substantial stress into the liner and which inhibits the formation of liners for lining large-diameter pipes and restricts the wall thickness of the liner. These two processes are both restricted to liners which do not exceed a pre-given wall thickness and this also affects the reliability of the lined pipe in certain instances. Other processes are heat/pressure processes which soften the material to the point of melting and, as such, are non-repeatable thermoplastic processes.

Several significant problems also exist with respect to the formation, coiling and reformation of the previously utilized liners such as the U-liner™ installations. For example, stresses introduced into the liner during deformation and coiling are oftentimes difficult to relieve upon installation. Flat spots sometimes occur in the reformed pipe, i.e., a wall portion of the reformed, generally cylindrical liner remains flat and spaced from the pipe wall being lined due to small circumferential length of the originally bent portion. For example, in the U-shaped liner, sharp bends over a small circumferential length as at the concave bent apex or peak of the U-shaped liner produce very high residual stresses. That is, in a U-shaped liner, its concave peak has the highest magnitude of residual stresses and the flat spot is sometimes formed from inadequate relief of the stresses at that concave peak. Also, the ability to coil long lengths of the deformed liner is very significant from a practical and commercial point of view. Large-diameter liners, of course, without substantial reduction in their deformed shape cannot be coiled in substantial lengths. This constitutes a significant limitation on the use of liners of this type for lining large-diameter pipes. That is to say, notwithstanding the reduction in cross-section, for example, afforded by a U-shaped liner, for large-diameter liners there remains the problem of an ability to coil and carry appropriate lengths of the deformed liner for later transport to the installation site. The reduction in cross-sectional size of the U-shaped liner, while significant, and approximating a 35% reduction in cross-section from the extruded cylindrical shape of the liner, is still not a sufficient reduction to enable long lengths of large-diameter liner, e.g., 18–50 inch diameter liners, to be coiled. Even with this significant reduction in cross-section of a U-shaped liner, there remains problems associated with pulling the liner through the pipe, particularly at bends in the pipe or areas of reduced cross-sections and local imperfections.

DISCLOSURE OF THE INVENTION

In accordance with the present invention, there is provided a liner for a pipe having a generally W-shaped cross-sectional configuration. That is, the liner, formed of a thermoplastic material, preferably polyethylene, has an initial cylindrical shape, preferably extruded, which is deformed to a non-cylindrical, generally W-shaped, cross-sectional configuration. Thus, the liner is deformed to define in cross-section three convex lobes and two concave lobes facing one side of the reduced liner and having longitudinal axes generally parallel to the longitudinal axis of the liner. The liner wall includes a convex portion along the opposite side of the liner opposite the lobes having a curvature less than the curvature of the lobes. The two concave lobes are inwardly directed and straddle an intermediate convex lobe, the concave lobes and the intermediate convex lobe being themselves straddled by a pair of outermost convex lobes.

The liner is deformed from an initial cylindrical cross-section having a predetermined diameter to the W or non-cylindrical cross-sectional shape having an extent in any cross-sectional direction less than one-half the predetermined diameter of the liner, i.e., on the order of a 55% reduction. The liner can be deformed into the W-shaped cross-sectional configuration by mechanical processes without making use of the shape-memory characteristics typified in the above-identified U.S. patents and the Laurent French patent. Thus, the liner may be deformed mechanically and held in its W-shaped configuration by taping or strapping, similarly as disclosed in the British and PCT documents identified above. Preferably, however, the shape-memory characteristics of the thermoplastic material are utilized in the manufacture of the W-shaped liner so that the deformed liner retains its W-shaped configuration without external assistance. That is, the liner is deformed to the W-shaped configuration in a process and at a temperature, for example, on the order of 77° C. (170° F.), wherein shape-memory characteristics are imparted to the liner during deformation. Thus, the liner is deformed at a temperature below the crystallization temperature of the thermoplastic material (which, for polyethylene, is about 113° C. (235° F.)) and is retained in that reduced cross-sectional configuration without external assistance.

To deform the liner, first, second and third pairs of rollers are spaced axially from one another or a deforming machine. The machine is located downstream of the extruded cylindrical liner and temperature conditions during deformation are maintained at approximately 77° C. (170° F.), where high-density polyethylene liner material is used. The cylindrical liner passes through the first set of rollers, the rollers of which are angularly aligned on opposite sides of and in planes passing through the axis of the cylindrical liner, to make introductory depressions on the round liner, forcing the depressions toward the centerline of the liner. The second set of rollers includes rollers disposed on opposite sides of the liner at a sharper angle to the vertical to engage the depressed areas, further depressing those areas to form the lobes. A third and final set of rollers are downstream from the second set of rollers. The rollers of the third set lie substantially vertically and parallel to one another on opposite sides of the liner axis to locate the concave lobes closely adjacent the large convex portion of the liner opposite the lobes. It will be appreciated that, as the liner is being pulled axially through the sets of rollers, guide rollers on opposite sides of the liner continuously restrict the lateral extent of the liner such that when the liner emerges from the deforming machine, the original cylindrical cross-section of the liner has been reduced to a generally W-shaped cross-section having a lateral extent less than one-half of the original diameter. As the liner emerges from the machine, it is cooled and is retained in the generally W-shaped configuration by the material itself without external strapping. On such deformed liners, a preformed or molded pulling head is quickly attached to the leading end of the liner in order to effectively connect the liner and the pulling cable to the reel so that tension can be maintained while coiling. Upon completion of the coiling, a similar pulling head is attached to the trailing end of the liner to maintain tension on the coiled liner and which similar pulling head can be used in installation. Thus, the cooled liner is maintained under tension upon completion of coiling up to the time the liner is installed.

The liner is then coiled onto a coil which may be disposed vertically or horizontally. Preferably, the W-shaped liner is coiled at an elevated temperature to facilitate the coiling operation. It will be appreciated that the W-shaped configuration enables a reduction i cross-sectional configuration of the liner of approximately 55% of its initial cylindrical configuration as compared with a reduction of only 35–40% for a U-shaped liner of like initial diameter. The magnitude of this decrease in cross-sectional shape is highly significant. It permits the coiling of larger lengths of large diameter liner for a given liner diameter than previously thought possible. Also, the W-shaped liner may be coiled in any orientation of its W cross-section vis-a-vis the axis of the coil. Where the W-shaped liner is disposed on the coil with the W-shaped liner on its side, i.e., six wall thicknesses across the lobes in a radial direction, the residual stresses from cooling the liner, essentially tensile stresses, are redistributed to a greater number of wall portions than, for example, as compared with a U-shaped liner. That is, the stresses applied to the liner by tensioning during coiling are redistributed on additional wall portions in the W-shaped liner as compared with a U-shaped liner. This is beneficial in avoiding "flat spots" upon installation of the liner. That is, there are less residual stresses which are also circumferentially more favorably distributed to be relieved upon installation. Also, because the W-shaped liner may be used to line large-diameter pipes, on the order of 18 inches up to 50 inches in diameter, the double-stressing effect in the concave/convex bends of the liner is extended over a larger circumference of the liner as compared with a U-shaped liner, rendering the W-shaped liner more easily reformable into the cylindrical configuration upon installation. It will also be appreciated that because of the greater reduction in cross-sectional area afforded by a W-shaped liner as compared with the other reduced liner shapes, for example, as set forth in the prior art alluded to above, the installation of the deformed liner into a pipe is more readily and easily accomplished as compared with pulling a reduced cross-sectional liner through the same diameter pipe where the reduction in cross-sectional area is not as great as the reduction in the W-shaped liner.

To install the W-liner, a process similar to the installation process as described in the above-noted U.S. Pat. No. 5,091,137 may be utilized, that disclosure being incorporated herein by reference. For example, the W-shaped liner may be pulled through the pipe to be lined directly from the coil. The opposite ends of the liner projecting from the pipe ends are sealed and suitable air and steam connections are made at opposite ends of the liner. Steam is then flowed into the liner at predetermined temperature and pressure, for example, 240° F. and a pressure of 10 psig for a polyethylene pipe. It will be appreciated that the lining temperature is below the crystallization melting temperature notwithstanding that the steam at 240° F. is above the crystallization temperature of the polyethylene liner material. The steam is held at the temperature and pressure for a period of time sufficient for the W-liner to reform into a generally cylindrical configuration throughout its length, the temperature facilitating the rounding of the liner by softening the plastic material. By holding the temperature of the liner material below crystallization melting temperature and supplying sufficient pressure, the liner material will not elongate and will inflate to a round shape against the walls of the pipe. Once the liner obtains the cylindrical shape, the temperature of the steam is raised to a temperature above the crystallization melting temperature of the material of the liner and the pressure is also raised for example, to 25 psig. By suitable measurements, the increased temperature and pressure is held for a sufficient time so that approximately 70% of the plastic material reaches the crystallization temperature of the liner material necessary to erase or eliminate the W-shape memory and restor the cylindrical memory. Thus, the cylindrical memory is reactivated and the W-shape memory is inactivated. Subsequent to the application of this higher temperature and pressure, the liner is cooled by introducing air or another fluid, for example, water into the liner, thereby setting the liner in its cylindrical configuration. The process for installing the W-shaped liner is also substantially the same as the process for installing a U-shaped liner, as described in U.S. Pat. No. 4,998,871, of common assignee herewith, and which patent is incorporated herein by reference.

It will be appreciated that the size of the liner may change dependent upon whether the liner is in a cold state or a hot state. Thus, an undersized liner in the cold state may become, for example, an oversized liner is a hot state. Undersizing on the order of 2–5% in a cold state may afford a tight fit in the host pipe once heat and pressure are applied.

In a preferred embodiment according to the present invention, there is provided apparatus for lining the interior of a generally cylindrical pipe comprising an elongated hollow liner formed of thermoplastic material having a longitudinal axis and a non-cylindrical cross-sectional shape for facilitating reception within the pipe, the liner being defined in cross-section by a continuous liner wall having three convex lobes and two concave lobes along one side of the liner having longitudinal axes generally parallel to the longitudinal axis of the liner, the liner wall including a convex portion opposite the lobes having a curvature less than the curvature of the lobes.

In a further preferred embodiment according to the present invention, there is provided apparatus for lining the interior of a generally cylindrical pipe comprising an elongated hollow liner formed of thermoplastic material having a longitudinal axis and a non-cylindrical cross-sectional shape for facilitating reception within the pipe, the liner being defined in cross-section by a continuous wall having three convex lobes and two concave lobes along one side of the liner and having longitudinal axes generally parallel to the longitudinal axis of the liner, the liner being expandable into a cylindrical cross-section from the non-cylindrical cross-section and to a predetermined outside diameter, the liner in the non-cylindrical cross-sectional shape having a lateral extent in any cross-sectional direction less than one-half of the predetermined diameter.

In a still further preferred embodiment according to the present invention, there is provided apparatus for deforming a substantially cylindrical hollow tube formed of thermoplastic material into a reduced, generally W-shaped liner, comprising a first pair of rollers angularly related one to the other on opposite sides of a plane through an axial centerline of the tube for introducing a depression along opposite sides of the tube on opposite sides of the plane, a second set of rollers spaced axially from the first set of rollers and being angularly related to one another on opposite sides of the plane for engaging in the introductory depressions in the tube and further depressing the portions of the tube engaged thereby toward the center axis of the tube; the rollers of the first and second sets of rollers lying in discrete planes passing through the axis of the tube, and a third set of rollers axially spaced from the second set of rollers and disposed on opposite sides of and for rotation in planes generally parallel to the first-mentioned plane for forming concave lobes along one side of the tube, with the third set of rollers straddling a convex lobe formed between the concave lobes. Elements are engageable with the tube for advancing the tube in an axial direction progressively through the first, second and third sets of rollers, shaped surfaces along opposite sides of the tube lie progressively closer to one another in the axial direction of advancement of the tube to confine the sides of the tube as the tube is advanced axially through the sets of rollers and a back-up surface underlies the tube for providing a reaction force to the forces applied to the tube by the first, second and third sets of rollers whereby a liner having a W-shaped cross-sectional configuration is formed.

In a still further preferred embodiment according to the present invention, there is provided a process for installing in situ a thermoplastic liner in a generally horizontally extending, generally cylindrical pipe, comprising the steps of providing an elongated hollow liner formed of thermoplastic material having a generally W-shaped cross-section with three convex lobes and two concave lobes on one side of the liner, inserting the liner into the pipe such that end portions of the liner extend beyond opposite end portions of the pipe, and sealing the end portions of the liner extending beyond the opposite ends of the pipe. Subsequent to the step of sealing the liner and while maintaining the liner sealed, generally conforming the liner to the interior wall of the pipe while maintaining substantially the original predetermined wall thickness by (1) injecting a heated fluid into and through the sealed liner; (2) pressurizing the interior of the liner to a first predetermined pressure above atmospheric pressure by means of the heated fluid; and (3) heating the liner to predetermined temperature by heat transfer from the heated fluid to the liner whereby the W-shaped liner returns substantially to its cylindrical cross-section. The pressure is increased in the liner to a second predetermined pressure above the first predetermined pressure to conform the liner substantially precisely to the interior wall surface contours of the pipe.

In a still further preferred embodiment according to the present invention, there is provided a coiled product for use in lining a pipe comprising a coil hub, a liner formed of thermoplastic material and having a generally W-shaped cross-sectional configuration coiled about the hub.

Accordingly, it is a primary object of the present invention to provide a novel and improved generally W-shaped thermoplastic liner for lining pipe lines, as well as methods for forming the W-shaped liner, coiling the W-shaped liner and installing the W-shaped liner is a pipe line.

BEST MODE FOR CARRYING OUT THE INVENTION

It will be appreciated that the present invention is concerned with the deformation of a substantially cylindrical or round tube formed of a thermoplastic material, preferably extruded in continuous lengths into a generally W-shaped deformed condition such that is largest cross-sectional dimension in any direction is reduced in magnitude in comparison with the diameter of the cylindrical or round tube from which the deformed liner is formed for insertion in its deformed state in a pipe to be lined. Thereafter, the deformed W-shaped liner is reformed or reinflated into its round configuration to engage the interior walls of the pipe, forming a reconstituted pipe line.

Figure 1:
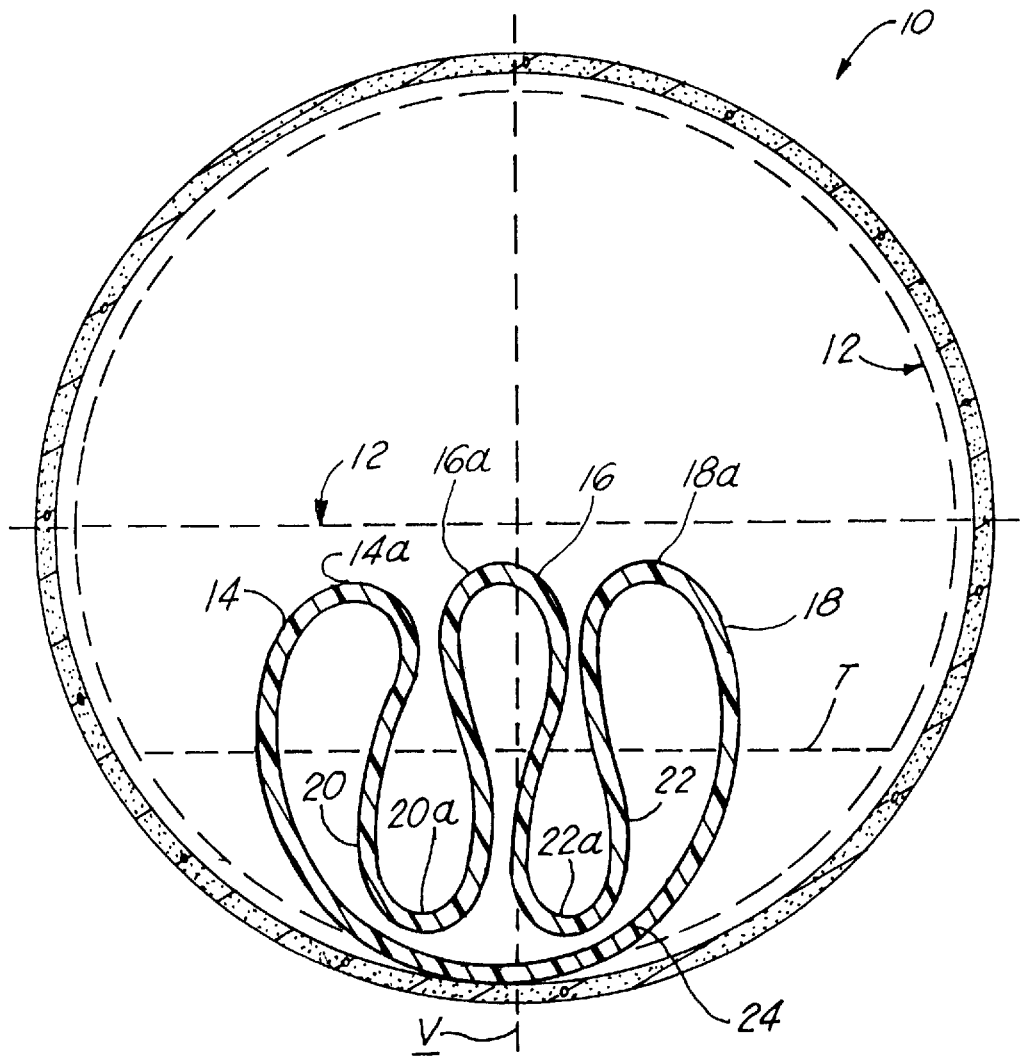
FIG. 1 is a cross-sectional view of a pipe to be lined and illustrating a generally W-shaped liner constructed in accordance with the present invention within the pipe line prior to expansion into a cylindrical shape for lining the pipe liner.

Referring now to FIG. 1, there is illustrated a pipe to be lined, generally designated 10 which, in the illustrated form, is of a cylindrical concrete construction. It will be appreciated, however, that the pipe to be lined may be formed of any material which typically forms pipe lines, for example, iron, steel, clay, ceramic, etc. Illustrated within the pipe 10 is a deformed, generally W-shaped liner 12 accordingly to the present invention. The liner 12 is preferably formed of a thermoplastic material, for example, high-density polyethylene (HDPE) which has been deformed from a generally cylindrical configuration having a diameter approximating the internal diameter of the pipe to be lined to the generally W-shaped cross-section illustrated wherein the liner has an extent in any cross-sectional direction less than one-half the diameter of the liner in its original cylindrical form or its subsequent inflated or expanded form, and particularly a reduction of about 55% from its original diameter.

Figure 2:
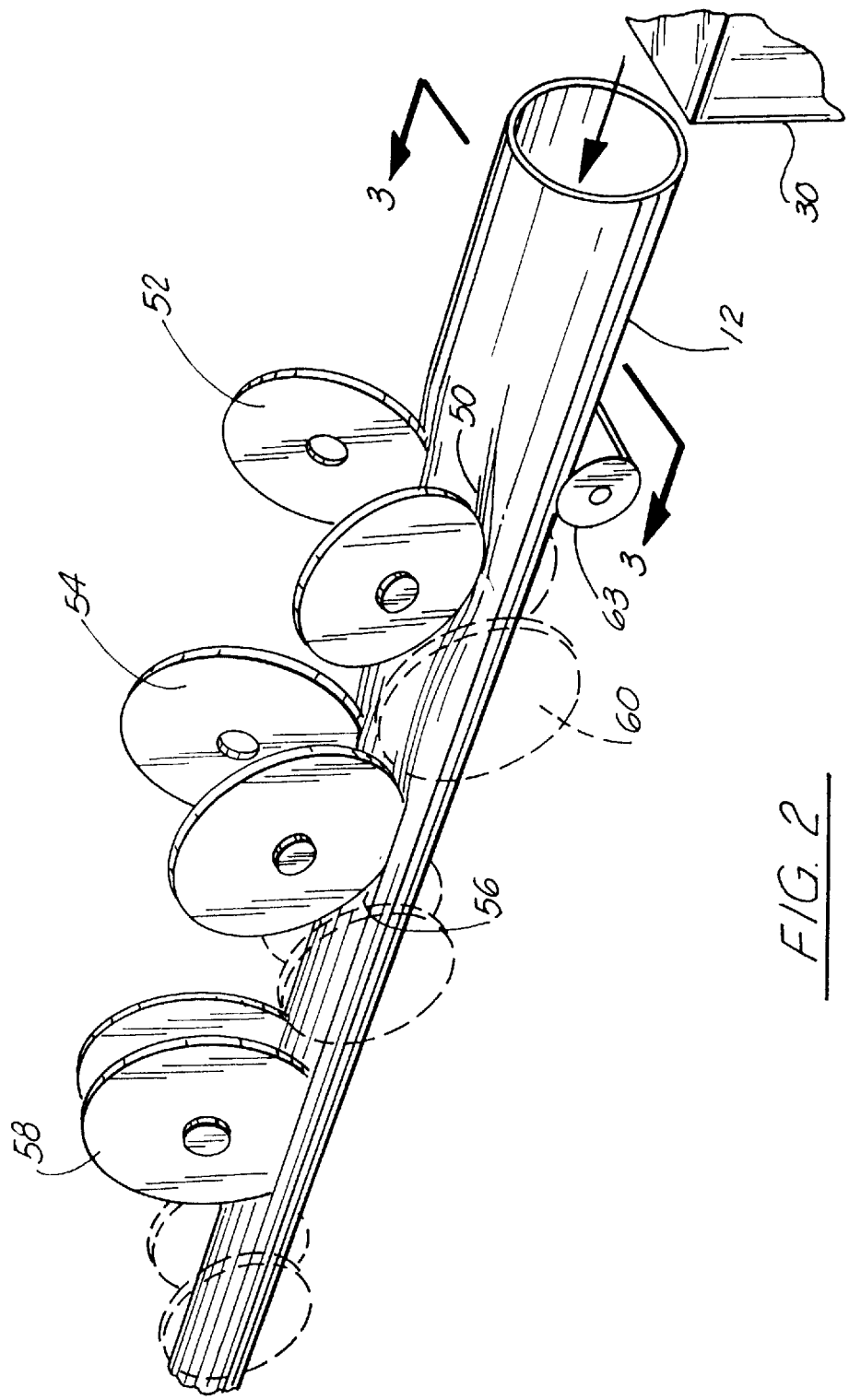
FIG. 2 is a perspective view of a portion of a process for forming the W-shaped or deformed liner of the present invention.

The W-shaped liner 12 includes a plurality of lobes, namely, convex lobes 14, 16 and 18, as well as concave lobes 20 and 22, along one side of the liner. The wall of the liner, of course, is continuous and forms multiple lobes which are bounded on the opposite side of the liner by a convex portion 24 of less curvature than the convex lobes 14, 16 and 18 and concave lobes 20 and 22. Consequently, the wall is continuous about the liner, with convex lobes 14 and 18 straddling an intermediate lobe 16 and the concave lobes 20 and 22 lying between convex lobes 14, 16 and 18, respectively. Each of the lobes includes a peak portion 14a, 16a, 18a, 20a and 22a where the curvature of the wall of the liner is at its greatest. Note also that each of the lobes has a reversed curved portion where the convex and concave portions transition to concave and convex portions, respectively. The liner 12 has a central axis A coextensive with its length (as best seen in FIG. 2). Also, note that the liner 12 is generally symmetrical about a vertical axis V which typically intersects the intermediate convex lobe 16a. Further, the liner 12 has a transverse axis T with the convex lobes 14, 16 and 18 on one side and the concave lobes 20, 22 on their opposite side as well as the convex portion 24. As previously mentioned, the W-shaped liner may be formed by a process wherein the liner has shape-memory characteristics or the line may be mechanically deformed and held in its deformed shape by mechanical means, all as noted in the patents identified in the background of this invention. Preferably, however, the line is provided with shape-memory characteristics whereby the deformed, generally W-shape of the liner will be maintained without assistance by any external mechanical means.

Figure 3:
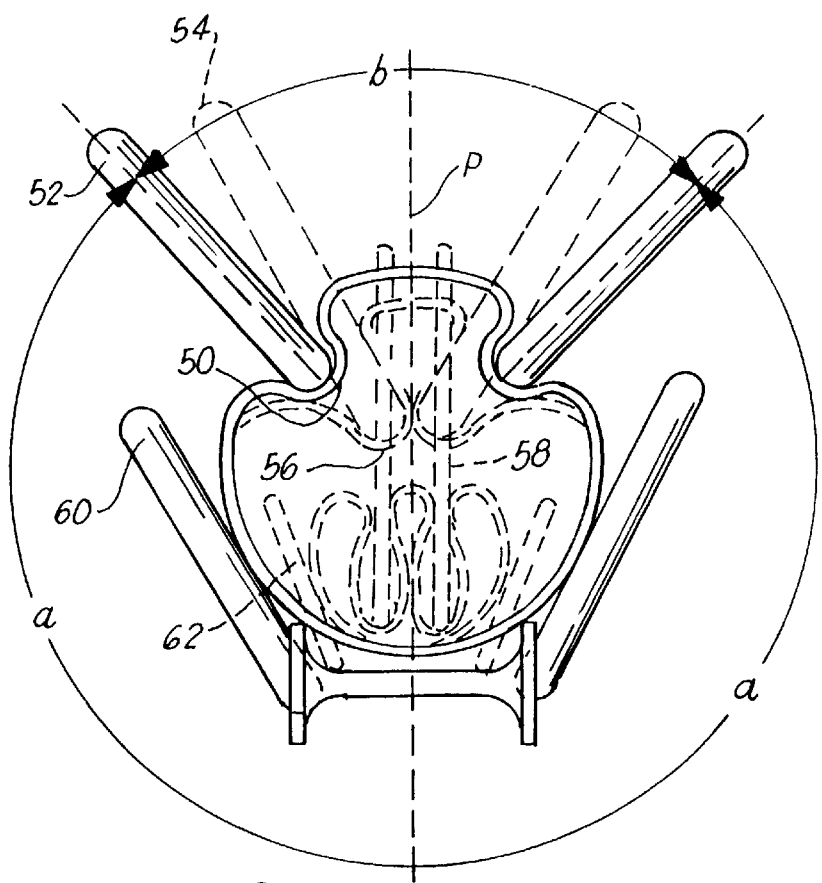
FIG. 3 is a cross-sectional view thereof taken generally about on lines 3—3 of FIG. 2.
Figure 4:
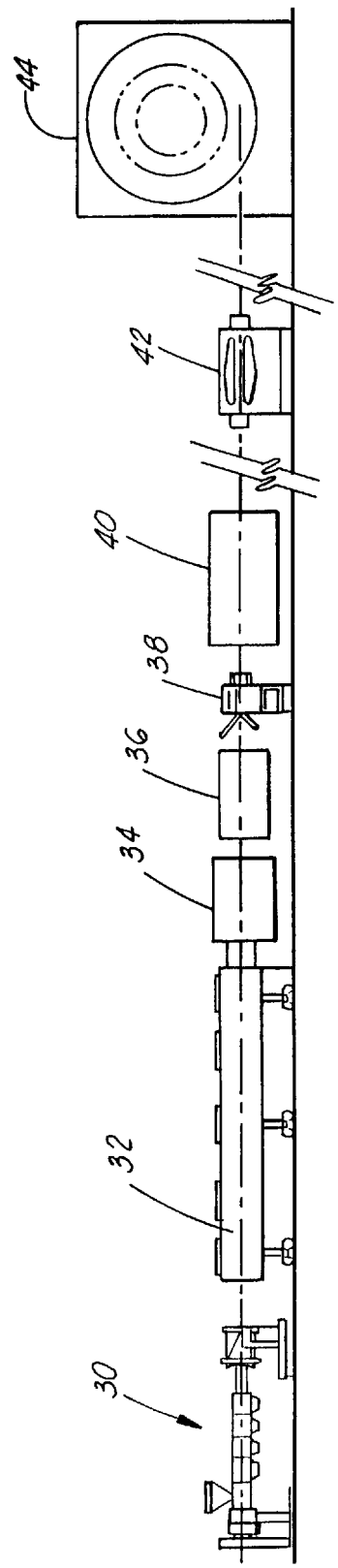
FIG. 4 is a schematic illustration of a product line for manufacturing the W-shaped liner according to the present invention.

Referring now to FIGS. 2–4, the liner is initially extruded by a conventional extruder 30 to an exterior diameter approximating the interior diameter of the pipe 10 to be lined. Obviously, various sizes of the cylindrical extrusion can be manufactured, depending upon the diameter of the pipe to be lined. For example, the cylindrical or round extruded liner to be deformed into a generally W-shaped configuration may have initial diameters from 18 inches to 50 inches, depending upon the diameter of the pipe to be lined. The extruded pipe passes from extruder 30 through a cooling apparatus 32 such that the extruded round pipe can be supplied to a deforming machine 34 at an appropriate temperature, affording the resulting deformed pipe with shape-memory characteristics. For example, for high-density polyethylene material, the liner temperature is reduced to approximately 77° C. (170° F.) as the liner passes through the deforming machine 34. It will be appreciated that the crystallization temperature for HDPE is 113° C. (235° F.). It will be appreciated that the thermoplastic material temperatures are what are known as known sharp point temperatures and that variations in such temperatures on the order of ±50 are common. The deformed liner exiting the deforming machine 34 then preferably passes through a deforming machine 36 for deforming the cylindrical liner into a different configuration, for example, a U-shaped configuration. That is to say, the assembly line can be adapted for forming the W-shaped liner from the round extruded liner or for forming other shapes, such as the U-shaped liner of the patents noted above, wherein one or the other of the deforming machine is inoperative.

Consequently, the same product manufacturing line may be used to manufacture liners of different cross-sectional shapes. Where the liner is deformed without imparting shape-memory characteristics to it and there is a need to maintain the deformed liner in its deformed cross-sectional configuration, a taping machine 38 may be provided to wrap tape about the deformed liner as it progresses downstream during the manufacturing process. The tape, of course, holds the liner is the deformed configuration. A cooler 40 is also provided for further cooling of the deformed liner. The liner then passes through a puller 42 which pulls the liner and advances it through the manufacturing process and onto a coil 44. The puller 42 may comprise a tractor-type machine having belts frictionally engaging the liner to pull the liner through the various deforming machines and coolers and supplying the liner to coiler 44. The coiler coils the deformed liner on a hub. The W-shaped liner may be coiled in virtually any orientation of the W-shaped cross-section but is preferably coiled on its side such that six layers of wall material are bent about the hub with the tensile stresses resulting from pulling the liner onto the coil being distributed along the six layers, hence minimizing residual stresses in the liner wall when the liner is uncoiled for installation. Additionally, the distribution of the tensile stresses over the six walls of the W-shaped liner facilitates a more readily expansion or inflation of the liner back to its original cylindrical form as described hereafter.

Referring now to FIGS. 2 and 3 in particular, there is schematically disclosed a deforming machine according to the present invention. As illustrated, the cylindrical extruded liner passes first through a pair of large-diameter rollers which make an introductory depression 50 in the cylindrical liner. Preferably, the rollers 52 lie along opposite sides of the cylindrical liner symmetrically about a vertical plane with a plane passing through the rollers extending through the centerline of the cylindrical liner. In a preferred embodiment, the rollers are each angled 132.3° from the intersection of a vertical plane P through the centerline of the cylindrical liner and the bottom of the liner as illustrated in FIG. 3 at angle a, forming an angle 95.40° between the planes passing through the rollers 52 at the top of the liner as illustrated at angle b. It shall be appreciated that the position of the deforming rollers is changeable as a function of the size of the pipe and may require minor adjustments to compensate for roller surface friction sliding in the process of deforming. Adjustments may be mechanical or self-adjusting as the liner moves through the deforming machine. A second set of rollers 54 downstream from the first set of rollers 52 are angled less sharply from the vertical plane through the center of the liner and have planes passing through the centerline of the liner. Rollers 54 engage in the depressions 50 to force the depressions further toward the centerline of the liner as illustrated at 56 in FIG. 3. A final set of laterally spaced generally vertically extending rollers 58 are disposed axially downstream of the first and second sets of rollers for engaging in the depressions 56. The rollers 58 lie on opposite sides of the plane P and finally deform the liner into the W-shaped configuration illustrated by the dashed lines in FIG. 3. Additionally, as illustrated in FIGS. 2 and 3, side rollers 60 or continuous surfaces, not shown, are formed along opposite sides of the liner as it is being deformed into its W-configuration. The surfaces or rollers 60 bear against the outer side walls of the liner and progressively angle inwardly as illustrated by the dashed line 62 in FIG. 3 to urge the side walls into the W-configuration as the liner moves progressively through the deforming machine. Additionally, back-up rollers or surfaces are disposed along the underside of the liner as it progresses through the rollers to provide a reactive supporting force. Only one such rollers 63 is illustrated, although it will be appreciated that additional rollers and/or surfaces are provided along the liner underside as it is being deformed. It will be recalled that in the preferred embodiment, the temperature of the liner, as it is being deformed into the W-shaped configuration, is maintained at approximately 77° C. (170° F.) whereby shape-memory characteristics are imparted to the liner during deformation to enable the liner to maintain its deformed, generally W-shaped cross-section when cooled and without external assistance. It will be appreciated that additional sets of rollers for forming the lobes in the W-shaped cross-section, as well as rollers or shaped surfaces for engaging the outer portions of the side lobes can be provided.

Figure 5:
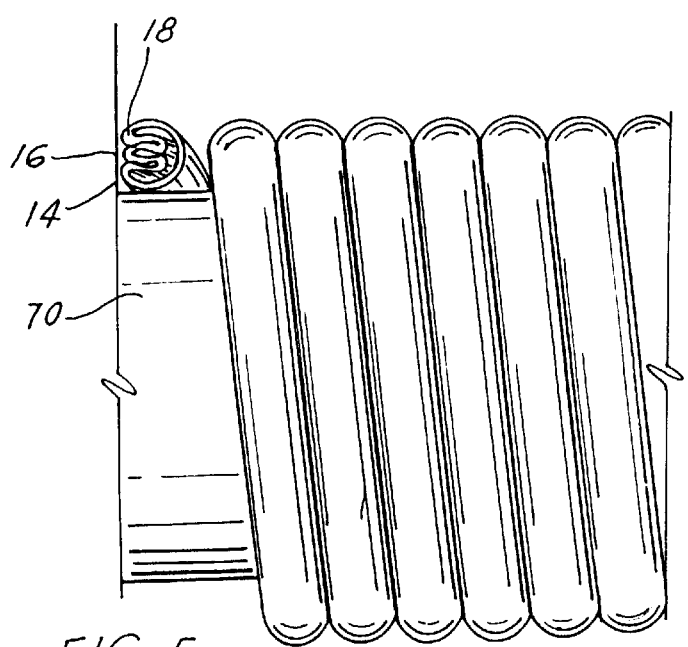
FIG. 5 is an enlarged elevational view of the W-liner of the present invention wound on a coil.

Once the liner has been formed, it is coiled about the hub 70 of a reel 44. The hub 70 may be disposed for coiling the W-shaped liner about a horizontal axis, as illustrated in FIG. 4. Alternatively and preferably, the liner is coiled on coil 44 such that the W-shaped liner lies on its side, i.e., as illustrated in FIG. 5. To coil the liner immediately after the liner is formed along the product line illustrated in FIG. 4 and with the W-shaped liner lying on its side, the coiling may be effected about a vertical axis. Thus, as illustrated in FIG. 5, six wall thicknesses constituting the walls of the lobes overlap one another in a generally radial direction. This is advantageous because the coiling stresses principally in tension are taken up by each of the six side walls, with each side wall carrying a reduced magnitude of stress as a result of the increased number of side walls, for example, as compared with a U-shaped liner. This facilitates relief of the stresses when the line is uncoiled during installation, as described hereafter. Thus, a lesser magnitude of residual stresses requiring relief upon installation is provided by coiling the W-shaped liner on its side about the reel. Note also that because of the very significant reduction in the cross-section of the W-shaped liner as compared with other reduced diameter cross-sections, for example, the U-shaped cross-section, a greater length of liner may be coiled on the reel for a given diameter of pipe liner.

Figure 6:
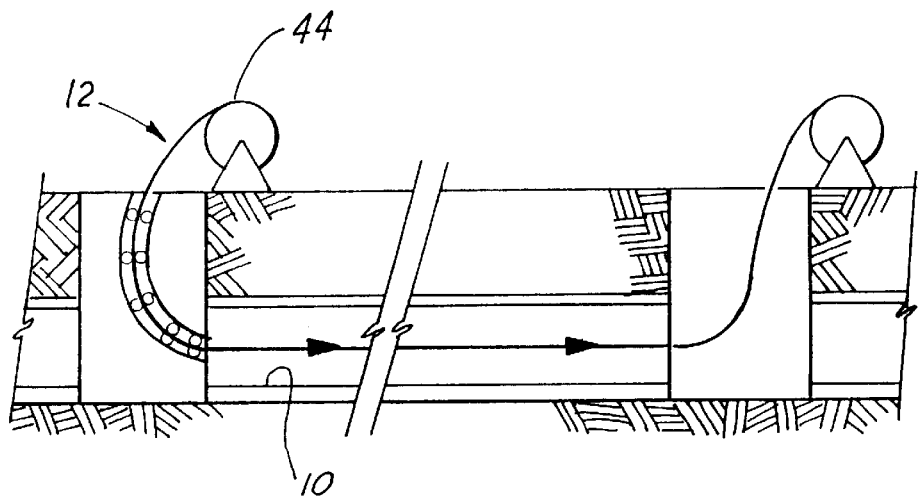
FIG. 6 is a schematic representation of the insertion of the W-shaped liner into a pipe to be lined.
Figure 7:
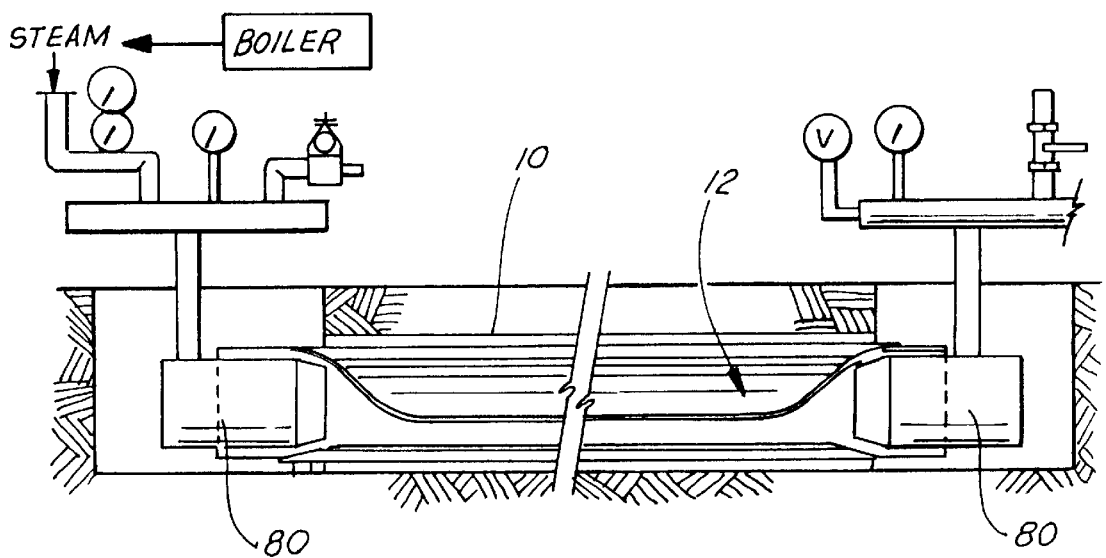
FIG. 7 is a schematic illustration of the process for inflating the W-shaped liner to a round configuration for lining the pipe.

Referring to FIGS. 6 and 7 hereof, the process described and illustrated in U.S. Pat. No. 5,091,137 for installing a generally U-shaped liner in a pipe line may be employed in the present invention to install the W-shaped liner hereof. Accordingly, the disclosure of U.S. Pat. No. 5,091,137 is incorporated herein by reference. Particularly, once the coil with the W-shaped liner carried thereon is located at the site, the coil is set up so that the W-shaped liner may issue from the top of the reel. A pulling line is attached to the end of the coil and the coil is pulled through the pipe to be lined. Various pulleys and shoes are used to avoid substantially stressing the liner. The W-shaped liner is situated in the pipe such that its ends extend beyond the ends of the pipe. By pinching off the liner ends or providing a closure for the liner ends projecting from the pipe, for example, a manifold 80, hot fluid and air connections may be provided both liner ends. Once the liner is sealed at both ends and steam and air couplings are in place, steam is supplied for flow into the liner at one end and for flow through the liner to its opposite end. The temperature of the steam in the liner may rise to approximately 240° F. with a pressure of 10 psig. By holding that steam temperature and pressure in the liner for a predetermined period of time, i.e., on the order of 15 minutes, the liner expands or inflates toward its generally cylindrical configuration. Note that while the steam temperature is above the crystallization temperature of the liner material, the lining temperature itself is below the crystallization temperature.

Once the liner has expanded or inflated to its round shape, the temperature of the steam input to the liner is raised to an even higher temperature, i.e., approximately 260°–265° F. The pressure is also stepped up to approximately 25 psig. This pressure and temperature are held for a predetermined time period. By elevating the temperature and applying higher pressure, the majority of the mass of the plastic material in the liner reaches the crystallization temperature of the plastic material sufficient to erase the memory of the W-shaped deformed pipe and to restore, activate or bring into prominence the cylindrical memory. Stated differently, approximately 70% of the liner wall thickness will be at a temperature above or at the crystallization temperature and this is sufficient to reactivate the memory of the round shape and inactive the memory of the W-shape. After these conditions are achieved, a cool-down and setting process occurs. For example, air may be injected into the liner to cool it, followed by water injection whereby the liner may be set in its final cylindrical configuration lining the pipe.

Multiple W-shaped liners may be installed one within the other within the host pipe, the liners being appropriately sized relative to one another. This is significant in lining large diameter pipes, e.g., 18 inches and up, because of the necessity of using a relatively thin wall liner as indicated herein. Thus, multiple liners may be employed one within the other within a host pipe. It will be appreciated that a process can be designed to obtain a desired result, such as where over-expansion of the liner into a large pipe is necessary, i.e., a smaller liner is installed into a larger host pipe. This requires greater heat to be applied to the liner to achieve further expansion. Generally, it will be further appreciated that field installations may vary and that exactly the same type of repeated installations may be coincidental.

While the invention has been described in connection with what is presently considered to be the most practical and preferred embodiment, it is to be understood that the invention is not to be limited to the disclosed embodiment, but on the contrary, is intended to cover various modifications and equivalent arrangements, such as processing variables, manufacturing and coiling options, and extent of sizes beyond those specified, which are included within the spirit and scope of the appended claims.

What is claimed is:

1. Apparatus for lining the interior of a generally cylindrical pipe comprising:

an elongated hollow liner formed of a shape memory thermoplastic material having a longitudinal axis and a non-cylindrical cross-section for facilitating reception within the pipe;

said liner being defined in cross-section by a continuous liner wall having three convex lobes of substantially the same lateral extent and two concave lobes along one side of said liner having longitudinal axes generally parallel to the longitudinal axis of the liner, said two concave lobes straddling a convex lobe intermediate a remaining pair of said three convex lobes, said liner wall including a convex portion opposite said lobes and having a curvature less than the curvature of said lobes, said non-cylindrical cross-section distributing the stresses applied to said lobes of said wall and said concave lobes approaching contact with said convex portion of said liner wall; and, said liner being expandable, by injecting a heated fluid under pressure therethrough, into a generally cylindrical cross-section from said non-cylindrical cross-section and to a certain outside diameter corresponding approximately to the inside diameter of said pipe, said liner in said non-cylindrical cross-sectional shape having a lateral extent in any cross-sectional direction less than one-half said certain outside diameter of said liner.

2. Apparatus according to claim 1 wherein each of said lobes has a curvature in excess of 180°.

3. Apparatus according to claim 1 wherein said thermoplastic material comprises polyethylene and said liner is expandable into a cylindrical cross-section from said non-cylindrical cross-section to a predetermined outside diameter within a range of 18–50 inches.

4. Apparatus according to claim 1 wherein said lobes have peaks, the peaks of the concave lobes lying closer to said convex wall portion than the peaks of the convex lobes.

5. Apparatus according to claim 1 wherein the liner has a transverse axis with said convex wall portion and said two concave lobes lying on one side of said axis and said three convex lobes lying on an opposite sides of said axis, the lobes extending continuously in cross-section along a periphery of said liner from a first convex lobe to a third convex lobe with a second convex lobe and said two concave lobes straddling said second convex lobe lying between said first and third convex lobes.

6. Apparatus according to claim 1 wherein said liner has a generally W-shaped cross-section substantially as illustrated in FIG. 1.

7. Apparatus according to claim 1 wherein the liner has a first axis in a cross-sectional plane of the liner, said convex wall portion and said two concave lobes lying on one side of said axis and said three convex lobes lying on an opposite side of said axis, a second axis normal to said first transverse axis and in said cross-sectional plane of the liner, first and third lobes of said convex lobes lying on opposite sides of said second axis with said second axis intersecting a second lobe of said convex lobes between said first and third convex lobes, said concave lobes lying on opposite sides of said second axis.

8. Apparatus according to claim 7 wherein the lobes are defined by a wall portion of said liner extending continuously and without interruption from and including said first convex lobe to and including said third convex lobe with the second convex lobe and said two concave lobes straddling said second convex lobe lying between said first and third convex lobes.

9. Apparatus for lining the interior of a generally cylindrical pipe having a certain diameter comprising:

an elongated hollow liner formed of a shape memory thermoplastic material having a longitudinal axis and a non-cylindrical cross-sectional shape for facilitating reception within the pipe;

said liner being defined in cross-section as generally non-cylindrical and having a continuous wall having three convex lobes of substantially the same lateral extent and two concave lobes along one side of said liner and having longitudinal axes generally parallel to the longitudinal axis of the liner, said two concave lobes straddling a convex lobe intermediate a remaining pair of said three convex lobes, said liner wall including a convex portion opposite said lobes and having a curvature less than the curvature of said lobes, said non-cylindrical cross-section distributing the stresses applied to said lobes of said wall and said concave lobes approaching contact with said convex portion of said liner wall, said liner being expandable, by injecting a heated fluid under pressure therethrough, into a generally cylindrical cross-section from said non-cylindrical cross-section and to a certain outside diameter corresponding approximately to the inside diameter of said Pipe, said liner in said non-cylindrical cross-sectional shape having a lateral extent in any cross-sectional direction less than one-half of said certain outside diameter.

10. A coiled product for use in lining a pipe comprising:

a coil hub;

a liner formed of a shape memory thermoplastic material and having a non-cylindrical cross-sectional configuration coiled about said hub, said non-cylindrical cross-section distributing the stresses applied to said liner, said liner being expandable, by injecting a heated fluid under pressure therethrough, into a generally cylindrical cross-section from said non-cylindrical cross-section and to a certain outside diameter corresponding approximately to the inside diameter of said pipe, said liner having three convex lobes and two concave lobes along one side thereof, said lobes along said one side of said liner facing in a generally radial direction, and, in said non-cylindrical cross-section, having a lateral extent in any cross-sectional direction less than one-half said certain outside diameter of said liner.

11. A coiled product according to claim 10 wherein said liner is wound about said hub with the lobes of said liner extending in a generally axial direction of said hub.

* * * * *